United States Patent [19]

Rhodes

[11] 4,036,269
[45] July 19, 1977

[54] AUTOMATIC SHAPING DEVICE WITH A PRE-CUTTING ASSEMBLY

[76] Inventor: Arthur J. Rhodes, 2601 Benoch Ave., Louisville, Ky. 40216

[21] Appl. No.: 610,417

[22] Filed: Sept. 4, 1975

[51] Int. Cl.² ............................ B27C 9/00; B27C 5/02; B26D 1/46
[52] U.S. Cl. ................................ 144/1 D; 83/809; 90/13.2; 144/139; 144/144 R; 144/145 R
[58] Field of Search ............. 144/1 R, 144 R, 144 A, 144/144.5, 145 R, 134 R, 137, 139, 2 R, 3 R, 41, 1 D, 134 A; 90/13.2; 83/794, 809

[56] References Cited

U.S. PATENT DOCUMENTS

| | | | |
|---|---|---|---|
| 1,017,461 | 2/1912 | Pourtauborde | 90/13.2 |
| 1,597,748 | 8/1926 | Whitney | 144/144 R |
| 1,834,684 | 12/1931 | Dannehower | 144/1 D |
| 2,722,957 | 11/1955 | Marvosh | 144/3 R X |
| 3,190,159 | 6/1965 | Wilkie et al. | 144/144 R X |
| 3,447,420 | 6/1969 | Rhodes et al. | 144/145 R X |
| 3,459,104 | 8/1969 | Parsons, Jr. | 144/145 R X |
| 3,476,159 | 11/1969 | Hawkins | 144/145 R |
| 3,739,826 | 6/1973 | Schell | 144/145 |

Primary Examiner—Othell M. Simpson
Assistant Examiner—W. D. Bray

[57] ABSTRACT

An automatic shaping device of the type including a table with a power-driven shaping tool projecting therefrom and a power-driven workpiece carrying member slidably mounted thereto with template carrying means thereon, the template carrying means being adaptable for engagement with a pre-cutting assembly wherein workpieces being shaped according to a pattern defined by the template is pre-cut by the pre-cutting assembly prior to being shaped to a finished form by the shaping tool.

5 Claims, 4 Drawing Figures

AUTOMATIC SHAPING DEVICE WITH A PRE-CUTTING ASSEMBLY

BACKGROUND OF THE INVENTION

The invention relates to improved automatic shaping devices and in particular relates to an improved automatic shaping device including means to pre-cut a workpiece prior to shaping.

In the production of duplicate parts of irregular shapes, such as, for example, wood table tops with irregular contours, automated shaping machines have been devised to perform the entire operation. The manufacturer of irregular shaped products from wood or similar type materials are cut from standard sized sheets which are generally rectangular-shaped. In working with these rectangular-shaped sheets difficulty has risen in that many times a particular irregular shaped product to be made from a template which is attached to the shaping machine requires pre-cutting of the corners of the sheets so that they will move along a given pattern and into a power-driven shaping tool. This pre-cutting is generally done prior to the placing of the sheet to be worked upon or into the shaping device.

SUMMARY OF THE INVENTION

In the present invention, it is recognized that it is desirable to provide a means for reproducing irregular shaped objects wherein the irregular shaped objects are reproduced a substantial number of times. It is further recognized that it is desirable to provide an improved automatic shaping device including a pre-cutting assembly thereto whereby workpieces may be pre-cut prior to final cutting by a shaping tool.

The present invention advantageously provides a straightforward arrangement for the preparation of an improved automatic shaping device. The present invention further provides an improved automatic shaping device including means thereon for pre-cutting workpieces prior to shaping.

Various other features of the present invention will become obvious to those skilled in the art upon reading the disclosure set forth hereinafter.

More particularly, the present invention provides in an automatic shaping device having a table, a power-driven shaping tool mounted to project above the table, a power-driven workpiece carrying member slidably mounted to the table, the workpiece carrying member including template carrying means thereon, the improvement comprising: a pre-cutting assembly movably engageable with a workpiece and template, the assembly including a power-driven cutting engageable with the workpiece, means for forcing the cutter into the workpiece, and a guide assembly engageable with the template, the guide assembly including means to move the cutter in conformity with the pattern defined by the outer periphery of the template.

It is to be understood that the description of the examples of the present invention given hereinafter are not by way of limitation. Various modifications within the scope of the present invention will occur to those skilled in the art upon reading the disclosure set forth hereinafter.

Referring to the drawings.

Figure 1:
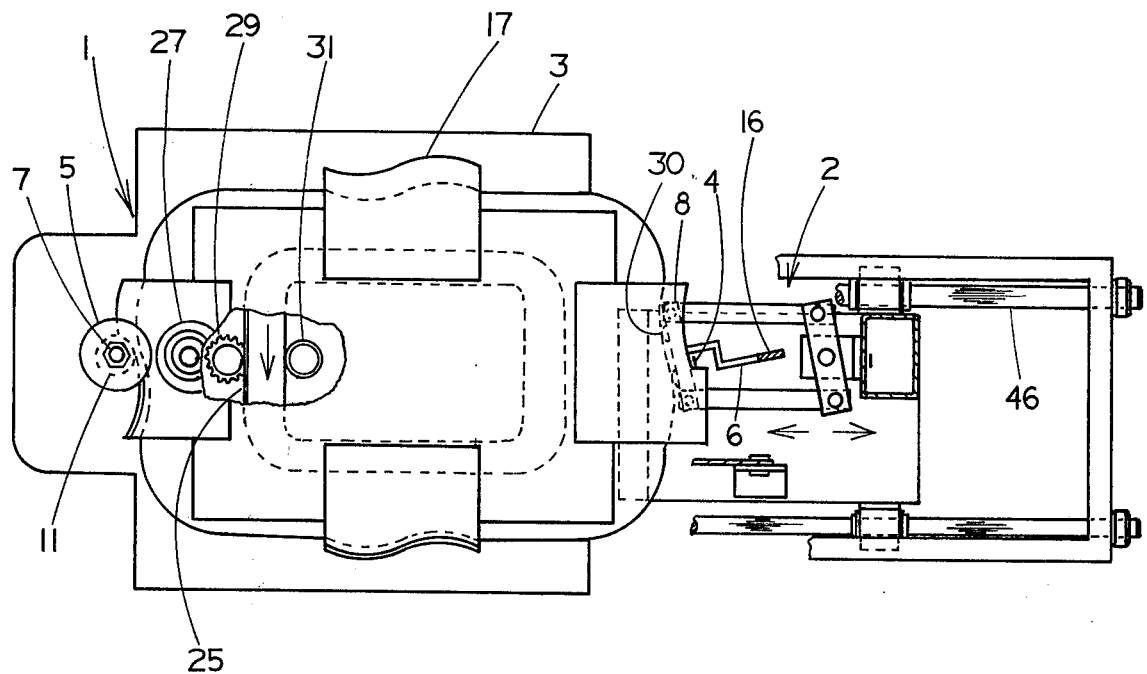
FIG. 1 is a plan view of an automatic shaper and pre-cutting assembly of the present invention with selected portions shown in dotted lines.
Figure 2:
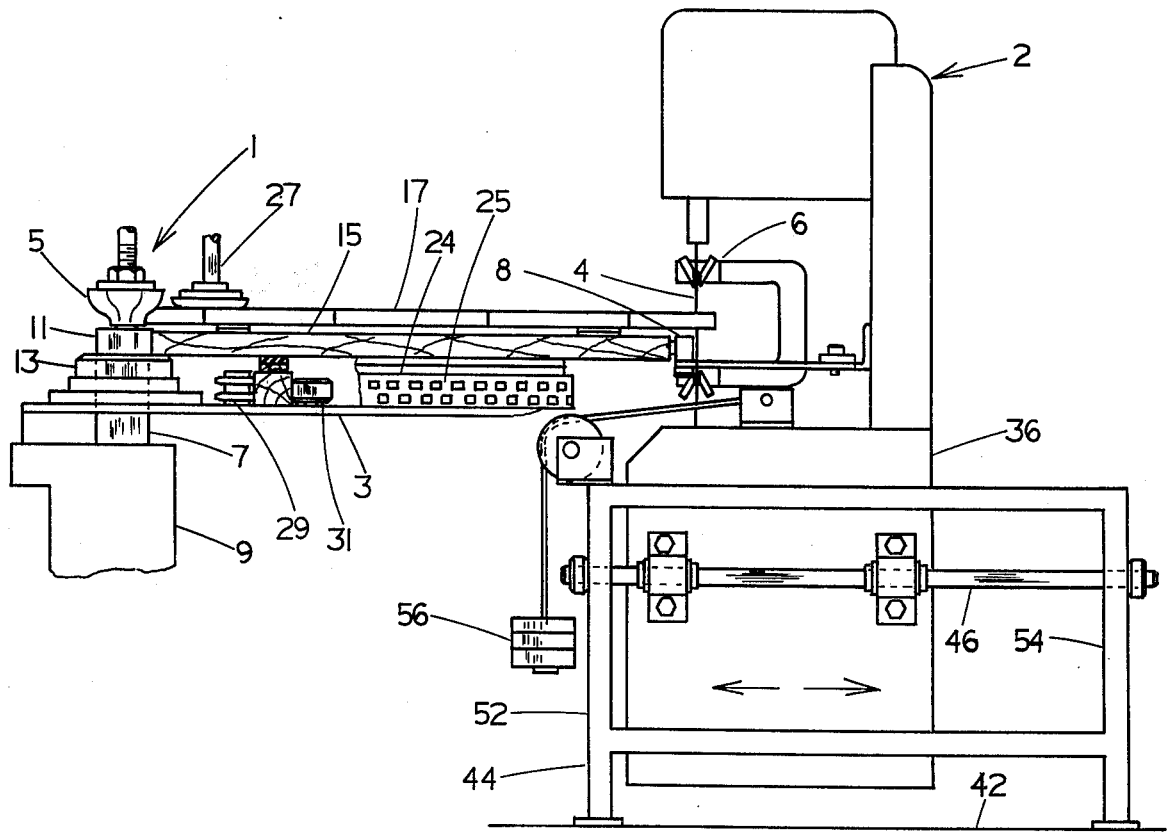
FIG. 2 is an elevational view, partially cut-away, of the automatic shaper and pre-cutting assembly of FIG. 1.

In FIGS. 1 and 2, an automatic shaper 1 is shown in combination with a pre-cutting assembly 2. The automatic shaper is known in the prior art and for descriptive purposes only the working parts which are essential to describe my improved shaping device including a pre-cutting assembly will be discussed. For a more thorough understanding of the automatic shaper I am using, I am referring to my patented automatic shaper which is described in U.S. Pat. No. 3,447,420.

The automatic shaper 1 includes a work area or table 3 with a smooth surface thereon upon which objects can move with complete freedom. A rotary shaping tool 5 is mounted for rotation on a vertical axis of a drive shaft 7 which is driven in response to a driving means in housing 9. Below the shaping tool 5 is a cylindrical stationary abutment 11 coaxial with shaft 7. Abutment 11 terminates with an outwardly extending bottom flange 13 which underlies and receives the edge of a template 15. Template 15 carries a pattern thereon and by bearing against the abutment 11 determines the movement of a workpiece 17 toward and away from shaping tool 5 and pre-cutting assembly 2, template 15 underlying and receiving the workpiece 17 thereon. The workpiece 17 is clamped to template 15 by holddown member 27. Holddown member 27 may be a clamp, or pressure means of conventional design, the only requirement being that the workpiece 17 is held in non-slipping relation with the template 15 upon movement of the template 15.

Supporting the template 15 is a pallet 24, and to the bottom of the pallet is affixed a closed track 25, track 25 being adapted to permit pallet 24 to make a complete cycle (360°) corresponding to one round trip of the drive means engaging the track 25, track 25 being held in place by pressure rollers 29 and 31. Pressure rollers 29 and 31 are driven by drive means (not shown) which may be any conventional drive means known in the art and may be the same drive means as the drive means for the shaping tool 5.

When resting on the table in operative position the pallet 24 and all parts associated therewith are supported by sliding engagement of the lower edge of the track 25 with the smooth surface of the table 3.

Figure 3:
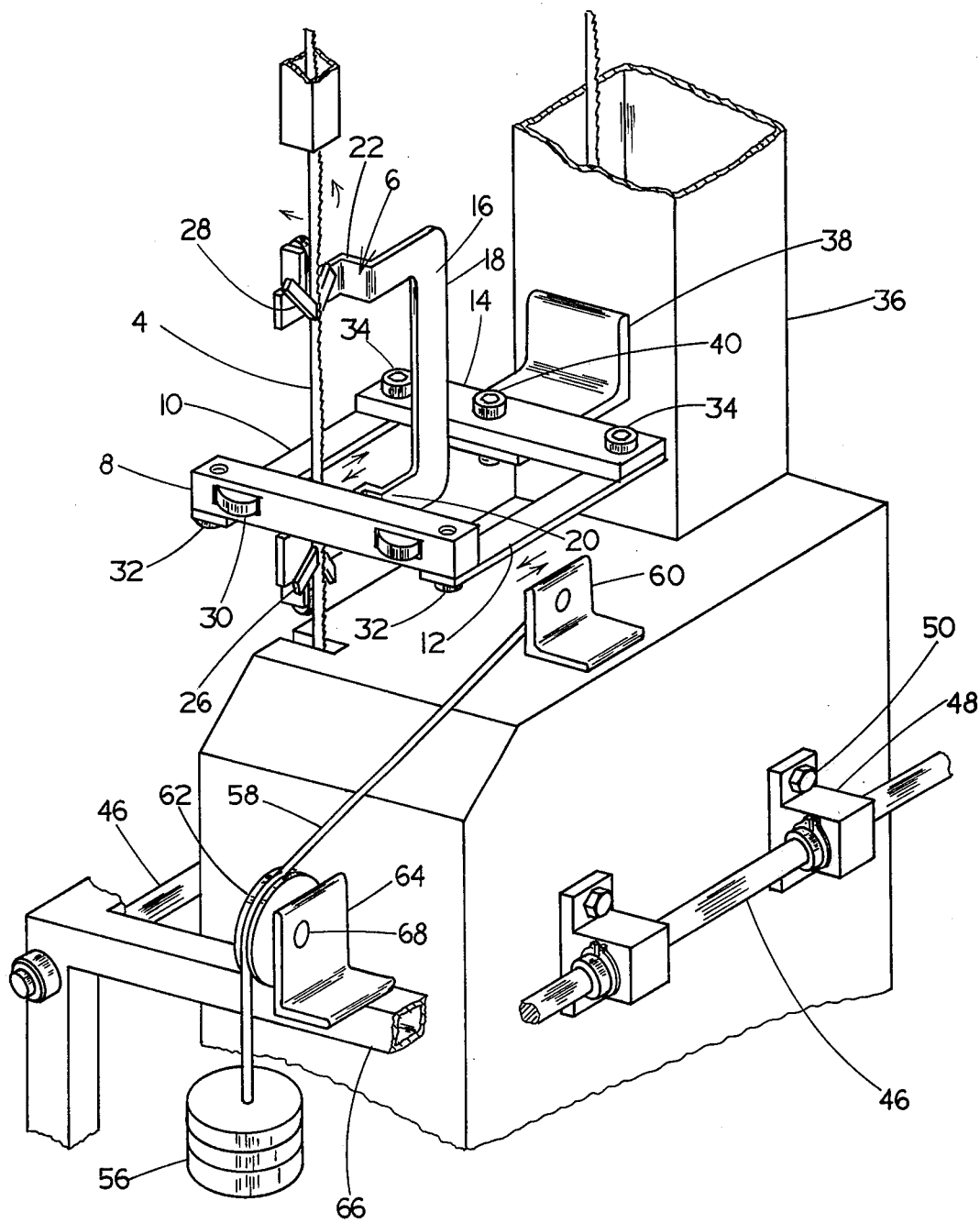
FIG. 3 is an enlarged perspective view, partially cut-away, of the pre-cutting assembly of FIGS. 1 and 2; and, FIG. 4 is an enlarged perspective view, partially cut-away, of another preferred pre-cutting assembly of the present invention.

The pre-cutting assembly 2, as best shown in FIG. 3, is disposed for movable engagement with the workpiece 17 and the template 15. The pre-cutting assembly 2 includes a cutting member, shown as a band saw blade 4, a guide assembly 6, and a means to force the pre-cutting assembly against the template 15. The band saw blade 4 is driven by a conventional drive motor and auxiliary equipment (not shown) which are well known in the art.

The guide assembly 6, as shown, includes a facing bar 8 with a pair of rotatably mounted rollers 30 on the facing surface thereof, facing bar 8 being movably attached by bolt members 32 to opposed side arms 10 and 12. Opposed side arms 10 and 12 extend rearwardly and are movably attached by bolt members 34 to a backing bar 14. Rollers 30 of facing bar 8 bear against the outer periphery of the template 15, the outer periphery defining the pattern to be cut by the cutter and subsequently the shaper, the facing bar 8 following the contour of the template. The facing bar 8 is a pre-selected distance from the blade 4 so that the cut of the workpiece member is of substantially the same contour as the template pattern, but extending a preselected distance away from the edge subsequently to be shaped.

The guide assembly 6 further includes a cutter guide bracket assembly 16. The cutter guide bracket assembly 16 is provided with a vertically extending generally C-shaped member 18 with a lower arm 20 of Z-shaped configuration fixedly attached by welding or other well known means to the underside of the facing bar 8 whereby the cutter guide bracket assembly 16 moves in response to movement of the facing bar 8. The lower arm 20 is provided with a pair of opposed guide bars 26, guide bars 26 converging upwardly with opposed vertically extending faces, the faces being spaced apart a distance approximately equal to the thickness of the band saw blade 4, band saw blade 4 being received between the guide bars 26. A horizontally extending upper arm 22 of Z-shaped configuration is also provided with a pair of opposed guide bars 28 thereon, guide bars 28 converging downwardly with opposed vertically extending faces thereon. The opposed guide bars 28 are in alignment with the guide bars 26 with band saw blade 4 disposed therebetween.

The guide assembly 6 is attached to the cutter housing 36 by means of L-shaped support bracket 38. L-shaped support bracket 38 is movably attached to guide assembly 6 by means of bolt member 40 at the upper extremity of one leg and is welded at the other leg to the housing 36 thereby allowing free movement of guide assembly 6 thereon.

The housing 36 is spaced from the floor 42 and is slidably mounted onto frame 44. Frame 44 includes a pair of opposed parallel bars 46 with the housing 36 disposed therebetween and slidably mounted thereon. Housing 36 is attached to bars 46 by means of support brackets 48, support brackets 48 being provided with apertures therein of substantially the same diameter as bars 46 with the apertures of brackets 48 receiving bars 46 therethrough. The bars 46 extend longitudinally of the frame 44 and are attached at opposed ends to downwardly extending legs 52 and 54, respectively of frame 44.

In order to force the pre-cutting assembly 2 toward shaper 1, attached to the front end of the housing 36 is a downwardly extending weight member 56, member 56 being of sufficient weight to overcome the horizontal force exerted by housing 36. A cable 58 is provided with weight member 56 being attached at one end thereof and the other end is attached to one leg of L-shaped bracket 60, the other leg of bracket 60 being attached by welding to housing 36. A vertically extending pulley 62 is provided to receive cable 58 thereon, pulley 62 being attached to transversely extending front support 66 of frame 44. An L-shaped bracket 64 is provided as the means to attach the pulley 62 to the support 66, one leg of bracket 64 having a bolt member 68 extending through the bracket 64 and attaching pulley 62 thereto, the other leg of bracket 64 being welded to the support 66. It is realized that means other than welding may be utilized for attaching bracket 60 to housing 36 and bracket 64 to support 66 without departing from the spirit and scope of my invention.

In operating a device of the present invention, template 15 is placed upon abutment 11 with a workpiece 17 mounted thereon and held in place with holddown member 27. Upon actuation of the power-driven motor in housing 9, template 15 and workpiece 17 rotate, the template 15 contacting as it rotates facing bar 8 with facing bar 8 in combination with the other movable parts of guide assembly 6 determining the position of saw blade 4 in relation to workpiece 17, blade 4 pre-cutting workpiece 17 into a contour defined by the pattern of the template 15. Pre-cut workpiece 17 continues to rotate and in turn comes in contact with shaping tool 5, shaping tool 5 shaping the workpiece into the finished product as defined by the pattern of the template 15.

Figure 4:
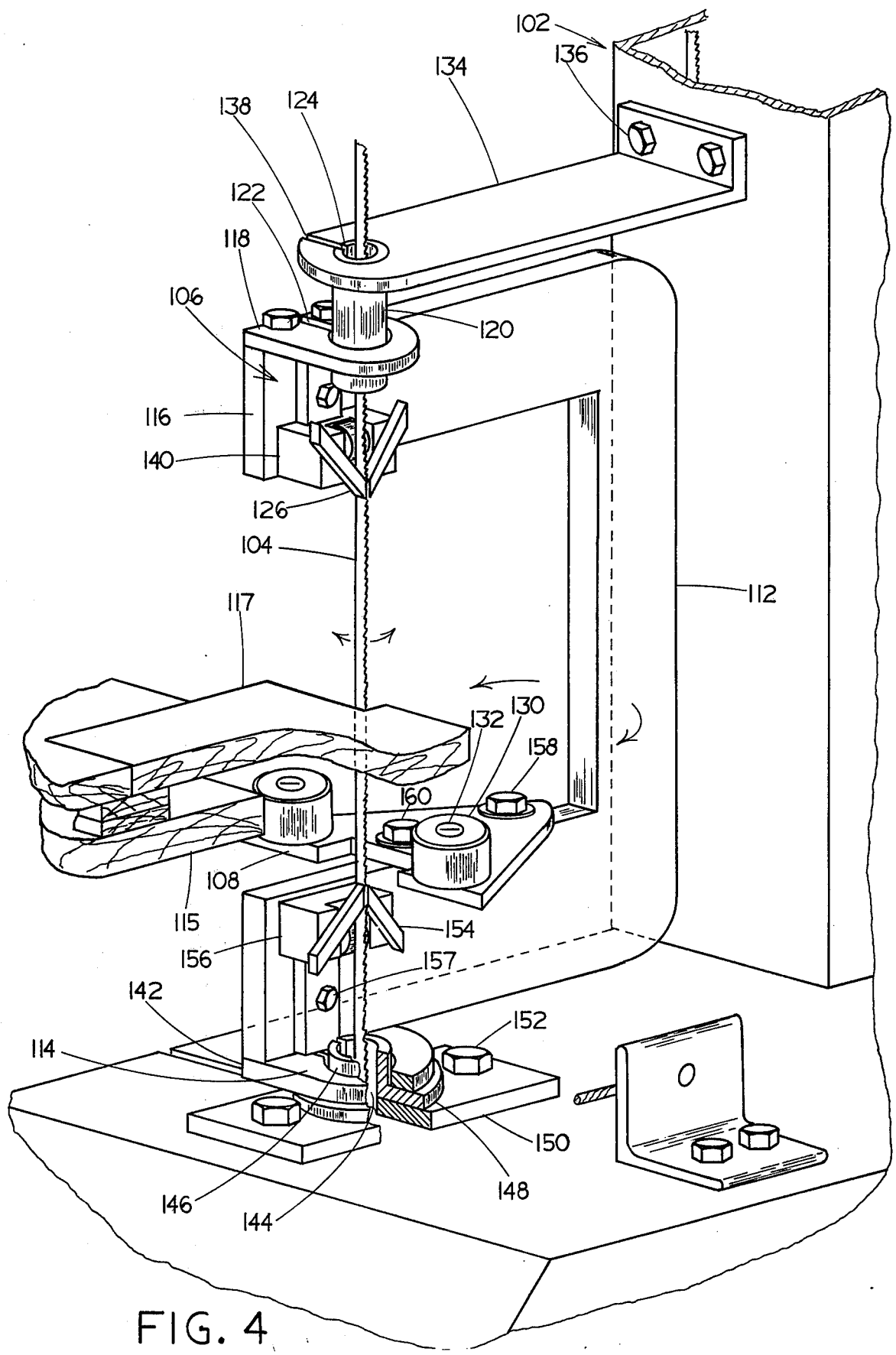

FIG. 4 is another preferred embodiment of the pre-cutting assembly shown. The pre-cutting assembly 102 is disposed for movable engagement with a workpiece 117 and a template 115. The pre-cutting assembly 102 includes a cutting member shown as a band saw blade 104, a guide assembly 106 and a means to force the pre-cutting assembly against the template 115. The band saw blade 104 is driven by a conventional drive motor and auxiliary equipment (not shown) which are well known in the art.

The guide assembly 106, as shown, includes a facing member 108, a pair of rollers 130 thereon and rotatably attached thereto by bolt members 132 to opposed sides of the facing member 108. Rollers 130 of facing member 108 bear against the outer periphery of the template 115, the outer periphery defining the pattern to be cut by the cutter and subsequently the shaper, the facing member 108 following the contour of the template 115. The rollers 130 of the facing member 108 are a preselected distance in front of the blade 104 so that the cut of the workpiece member is of substantially the same contour as the template pattern, but extending a preselected distance from the edge subsequently to be shaped.

The guide assembly 106 includes an upper guide support assembly 116 and a lower guide support 114 mounted at opposed ends of a vertically extending C-shaped member 112. The upper guide support 116 includes a pair of opposed guide bars 126, guide bars 126 converging downwardly with opposed vertically extending faces, the faces being spaced apart approximately equal to the thickness of the band saw blade 104, band saw blade 104 being received between the guide bars 126. The upper guide support 116 further includes at the upper portion thereof an outwardly extending member 118 with an aperture therein and a vertically extending cylinder 120 therethrough, the outwardly extending portion 118 and the cylinder 120 having slots 120 and 124 therein, respectively, the slots being adaptable for removal and replacing of band saw blade 104, when desired. The upper extremity of the vertically extending cylinder 120 is supported by an L-shaped bracket 134 which is fixedly attached to the housing 102 by bolt members 136. L-shaped support member 134 also is provided with a slot 138 therein in alignment with slots 120 and 124.

The guide bars 126 are attached to spacing member 140, spacing member 140 being of a preselected thickness to align the guide bars 126 with the cylinder 120. The spacing member 140 is in turn fixedly attached to C-shaped member 112.

The lower guide support 114 includes an outwardly extending arm member 142 with an aperture 144 therein to receive the band saw blade 104 therethrough. Axially aligned with and received by the aperture 144 is flange 148 having a vertically extending cylindrical portion 146 extending through the aperture 144 with the outwardly extending portion underlying the outwardly extending member 142. The flange 148 is supported by spacing plate member 150, plate member 150 having an aperture therein in coaxial alignment with the upwardly extending cylindrical portion 146, the support being fixedly attached to the housing 102 by the bolt members 152.

The upper portion of the lower guide support 114 includes a pair of opposed guide bars 154, guide bars 154 converging upwardly with opposed vertically extending faces thereon. Opposed guide bars 154 are in alignment with the upper guide bars 126 to receive the band saw blade 104 therethrough. Guide bars 154 are attached to a spacing member 156, spacing member 156 being of preselected thickness to align guide bars 156 with guide bars 126. Spacing member 156 is fixedly attached to the C-shaped member 112 by bolt member 157.

The facing member 108 including the guide rollers 130 attached thereto is fixedly secured to the C-shaped member 112 by bolt members 158 and 160, respectively. Facing member 108 is spaced a preselected distance from the band saw blade 104 and the contact of the rollers 130 with the template 115 positioning the workpiece 117 to be cut on a contour configuration corresponding to the contour of the pattern but a preselected distance therefrom.

It will be realized that various changes may be made to the specific embodiments shown and described without departing from the scope and spirit of the present invention.

What is claimed is:

1. In an automatic shaping device having a table, a power-driven shaping tool mounted to project above said table, a power-driven workpiece carrying member movably mounted to said table, said workpiece carrying member including template carrying means, the improvement comprising:
    a frame having a cutting assembly means movably mounted thereto, said cutting assembly means including a power-driven band saw with a housing therefor;
    forcing means cooperating with said cutting assembly and attached thereto for forcing said band saw into said workpiece; and,
    a guide assembly attached to said housing, said guide assembly engageable with a template in conformity with a pattern defined by the outer periphery of said template.

2. The device of claim 1, said means for forcing said band saw into said workpiece being a downwardly extending weight member attached by cable means to said housing facing said shaper, said cable being received by a vertically extending pulley attached to said frame disposed between said weight member and the point of attachment to said housing.

3. The device of claim 1, said guide assembly including a band saw guide bracket assembly mounted onto said housing, said bracket assembly including a movably mounted facing bar communicating with said template and movable in response to the contour of the outer periphery of said template, said facing bar being in communication with said band saw, said band saw being movable in response to movement of said guide bar.

4. The device of claim 3, said facing bar having rollers on the face thereof in contacting relation with said template.

5. The device of claim 3, said band saw being spaced from said facing bar and said template.